US012031674B2

(12) United States Patent
Takano et al.

(10) Patent No.: US 12,031,674 B2
(45) Date of Patent: Jul. 9, 2024

(54) HIGH-PRESSURE HYDROGEN CONTAINER

(71) Applicant: JFE STEEL CORPORATION, Tokyo (JP)

(72) Inventors: Toshio Takano, Tokyo (JP); Hiroshi Okano, Tokyo (JP); Kotaro Kadota, Tokyo (JP); Shusaku Takagi, Tokyo (JP); Kazuki Matsubara, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 86 days.

(21) Appl. No.: 17/919,871

(22) PCT Filed: Apr. 19, 2021

(86) PCT No.: PCT/JP2021/015876
§ 371 (c)(1),
(2) Date: Oct. 19, 2022

(87) PCT Pub. No.: WO2021/215399
PCT Pub. Date: Oct. 28, 2021

(65) Prior Publication Data
US 2023/0175646 A1    Jun. 8, 2023

(30) Foreign Application Priority Data

Apr. 20, 2020 (JP) ................................. 2020-074739
Apr. 16, 2021 (JP) ................................. 2021-069733

(51) Int. Cl.
*F17C 1/00* (2006.01)
*F16J 13/12* (2006.01)
*F16J 15/10* (2006.01)

(52) U.S. Cl.
CPC ............... *F17C 1/005* (2013.01); *F16J 13/12* (2013.01); *F16J 15/10* (2013.01); *F17C 2250/0452* (2013.01)

(58) Field of Classification Search
CPC .......... B65D 45/02; F17C 13/06; F17C 1/005; F17C 2205/0308; F17C 2205/0311;
(Continued)

(56) References Cited

U.S. PATENT DOCUMENTS

| 1,533,173 A | * | 4/1925 | Egloff | ...................... C10G 9/08 |
| | | | | 220/582 |
| 2,360,391 A | * | 10/1944 | Birchall | .................... F17C 1/02 |
| | | | | 292/259 R |

(Continued)

FOREIGN PATENT DOCUMENTS

| CN | 108626566 A | 10/2018 |
| CN | 110242858 A | 9/2019 |

(Continued)

OTHER PUBLICATIONS

Nov. 1, 2022 Office Action issued in Japanese Patent Application No. 2021-069733.

(Continued)

*Primary Examiner* — Robert J Hicks
(74) *Attorney, Agent, or Firm* — Oliff PLC

(57) ABSTRACT

A high-pressure hydrogen container is provided that has a simple configuration, requiring less labor for manufacture, achieving reduced manufacturing costs, and ensuring pressure resistance. The high-pressure hydrogen container includes a metal cylinder configured to store high-pressure hydrogen, a pair of lid parts configured to cover both end portions of the metal cylinder, and a plurality of fastening parts configured to fix the pair of lid parts in a state where the metal cylinder is clamped between the pair of lid parts.

19 Claims, 6 Drawing Sheets

(58) Field of Classification Search
CPC . F17C 2209/228; F17C 2209/22; F16J 12/00; F16J 13/12; F16J 13/02; F16J 15/10; F16J 15/06; B60K 15/03
USPC ..... 220/582, 581, 4.17, 4.12, 241, 328, 327, 220/315
See application file for complete search history.

(56) References Cited

U.S. PATENT DOCUMENTS

| | | | | |
|---|---|---|---|---|
| 3,080,201 | A | * | 3/1963 | Escola ............... F16J 10/02 220/4.17 |
| 3,098,578 | A | * | 7/1963 | Rudelick ............ F17C 1/10 220/601 |
| 6,065,630 | A | * | 5/2000 | Outwater .......... G01N 21/0317 220/582 |
| 2008/0035200 | A1 | | 2/2008 | Chabak |
| 2015/0372322 | A1 | | 12/2015 | Shimoyana et al. |
| 2018/0266632 | A1 | | 9/2018 | Ogiwara et al. |
| 2019/0049067 | A1 | | 2/2019 | Sawai et al. |
| 2019/0049069 | A1 | | 2/2019 | Wada et al. |

FOREIGN PATENT DOCUMENTS

| | | | | |
|---|---|---|---|---|
| GB | 2460928 | A | | 12/2009 |
| JP | S50-18613 | B1 | | 7/1975 |
| JP | S54-6505 | B2 | | 3/1979 |
| JP | S61-62666 | A | | 3/1986 |
| JP | S62-101969 | A | | 5/1987 |
| JP | H06-286993 | A | | 10/1994 |
| JP | H08-219284 | A | | 8/1996 |
| JP | 2003133392 | A | * | 5/2003 ............ H01L 21/68 |
| JP | 3532714 | B2 | | 5/2004 |
| JP | 2007044640 | A | * | 2/2007 ............... C02F 1/46 |
| JP | 2014-15983 | A | | 1/2014 |
| JP | 2016-183687 | A | | 10/2016 |
| JP | 6120017 | B2 | | 4/2017 |
| JP | 6156712 | B1 | | 7/2017 |
| JP | 2017-183275 | A | | 10/2017 |
| JP | 2019-35441 | A | | 3/2019 |
| JP | 2019-100463 | A | | 6/2019 |
| KR | 10-2018-0114034 | A | | 10/2018 |
| RU | 2 267 694 | C1 | | 1/2006 |
| RU | 2 371 708 | C1 | | 10/2009 |
| WO | 2017/187470 | A1 | | 11/2017 |

OTHER PUBLICATIONS

Feb. 6, 2023 Search Report issued in Indian Patent Application No. 202217063145.
May 5, 2023 Office Action issued in Russian Patent Application No. 2022127132.
Dec. 8, 2023 Office Action issued in Australian Patent Application No. 2021259986.
Sep. 12, 2023 Extended Search Report issued in European Patent Application No. 21793205.2.
Oct. 18, 2022 Office Action issued in Chilean Patent Application No. 2877-2022.
Jun. 22, 2021 International Search Report issued in International Patent Application No. PCT/JP2021/015876.
Mar. 27, 2024 Office Action issued in Chinese Patent Application No. 202180029311.9.
Apr. 22, 2024 Office Action issued in Korean Patent Application No. 10-2022-7036279.

* cited by examiner

HIGH-PRESSURE HYDROGEN CONTAINER

TECHNICAL FIELD

The present disclosure relates to a high-pressure hydrogen container that stores high-pressure hydrogen.

BACKGROUND ART

For fuel cell type conveying vehicles, a technique has been disclosed that uses a high-pressure hydrogen container where an inlet-outlet port for high-pressure hydrogen is provided to a dome-shaped top portion formed at one end portion of a cylinder portion (see Patent Literature 1, for example).

CITATION LIST

Patent Literature

Patent Literature 1: Japanese Patent No. 6120017

SUMMARY OF INVENTION

Technical Problem

However, the technique disclosed in Patent Literature 1 has a repeated pressure cycle for high-pressure hydrogen, which is anticipated during the use of the high-pressure hydrogen container mounted on the conveying vehicle. Therefore, to reduce a stress level, a cylinder portion having a large thickness is used for a barrel portion, and a dome-shaped portion is formed at one end portion of the cylinder portion. Accordingly, in the manufacture of the high-pressure hydrogen container ensuring pressure resistance, labor is required and hence, there is a problem in that a manufacturing cost is increased.

The present disclosure has been made to solve the above-mentioned problems, and it is an object of the present disclosure to provide a high-pressure hydrogen container having a simple configuration, requiring less labor for manufacture, achieving reduced manufacturing costs, and ensuring pressure resistance.

Solution to Problem

A high-pressure hydrogen container of an embodiment of the present disclosure includes a metal cylinder configured to store high-pressure hydrogen, a pair of lid parts configured to cover both end portions of the metal cylinder, and a plurality of fastening parts configured to fix the pair of lid parts in a state where the metal cylinder is clamped between the pair of lid parts.

Advantageous Effects of Invention

In the high-pressure hydrogen container of an embodiment of the present disclosure, the plurality of fastening parts fix the pair of lid parts in a state where the metal cylinder is clamped between the one lid part and the other lid part of the pair of lid parts. Therefore, the high-pressure hydrogen container can be manufactured by fixing the pair of lid parts with the plurality of fastening parts. Accordingly, it is possible to provide a high-pressure hydrogen container having a simple configuration, requiring less labor for manufacture, achieving reduced manufacturing costs, and ensuring pressure resistance.

DESCRIPTION OF EMBODIMENT

A preferred embodiment of a pressure accumulator of the present disclosure is described in detail hereinafter with reference to drawings. The embodiment described below is a favorable specific example of the present disclosure, technically preferable various limitations are thus imposed on the embodiment. However, the scope of the present disclosure is not limited to the embodiment unless there is a particular description of limiting the present disclosure in the following description.

Configuration of Forklift 100

Figure 1:
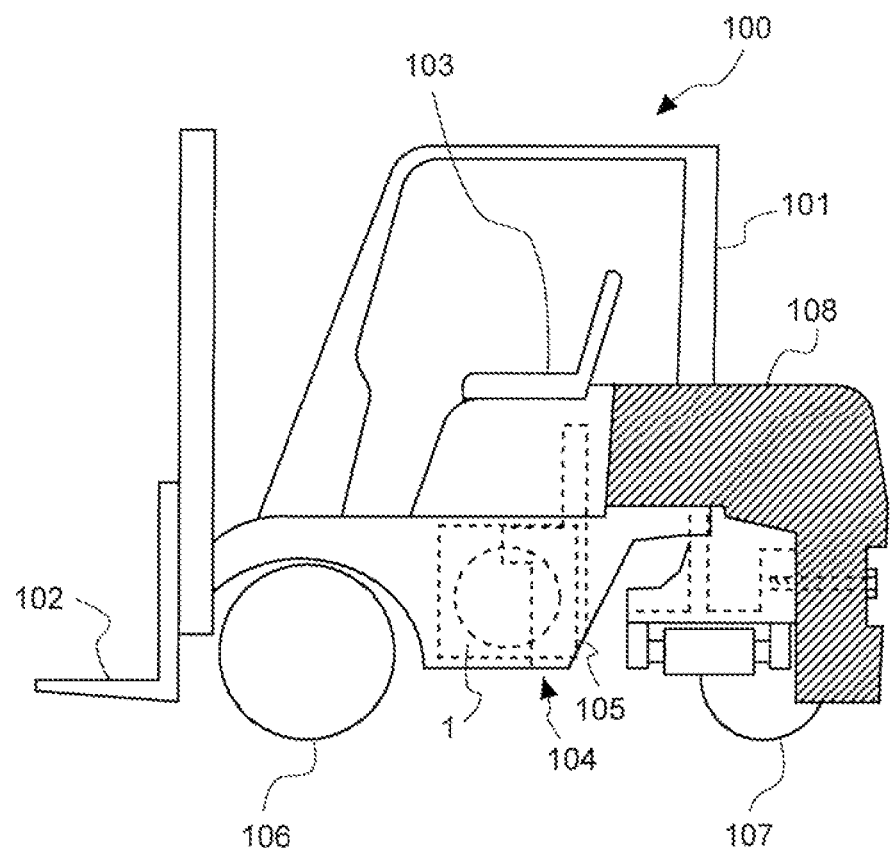
FIG. 1 is a schematic configuration diagram showing a forklift according to Embodiment.

FIG. 1 is a schematic configuration diagram showing a forklift 100 according to Embodiment. The forklift 100 shown in FIG. 1 is a fuel cell type transport vehicle. The forklift 100 includes a cargo handling device 102 at the front portion of a vehicle body 101. The forklift 100 includes a driver's seat 103 at the center portion of the vehicle body 101.

The forklift 100 includes a fuel cell 104 below the driver's seat 103. The fuel cell 104 includes a power generation unit 105 and a high-pressure hydrogen container 1. The power generation unit 105 causes oxygen in air and hydrogen supplied from the high-pressure hydrogen container 1 to chemically react to generate power.

The forklift 100 includes a pair of front wheels 106, which are drive wheels, and a pair of rear wheels 107, which are steered wheels. The pair of front wheels 106 are provided at the front portion of the vehicle body 101, and the pair of rear wheels 107 are provided at the rear portion of the vehicle body 101. The pair of front wheels 106 are driven by an electric motor not shown in the drawing. Power is supplied to the electric motor from the power generation unit 105. The pair of rear wheels 107 are steered by a driver riding on the driver's seat 103.

The forklift 100 includes a counterweight 108 at the rear portion of the vehicle body 101. The counterweight 108 adjusts a vehicle weight and weight balance of the vehicle body 101. The forklift 100 does not include a counterweight at the front portion of the vehicle body 101. The high-pressure hydrogen container 1 is provided at the center portion of the vehicle body 101 of the forklift 100, and has a weight that assists the counterweight 108. That is, the high-pressure hydrogen container 1 also serves as a portion of the counterweight of the forklift 100. Therefore, the fuel cell 104 is housed in a light-weight casing, which is not shown in the drawing, and that can be easily processed. The casing does not serve as a portion of the counterweight.

Other Transport Vehicles

As described above, the high-pressure hydrogen container 1 is used for the forklift 100. However, the use of the high-pressure hydrogen container 1 is not limited to the forklift 100. The high-pressure hydrogen container 1 is also used for other transport vehicles. Examples of a transport vehicle for which the high-pressure hydrogen container 1 is used may include a towing car used in an airport or other place.

Configuration of High-Pressure Hydrogen Container 1

Figure 2:
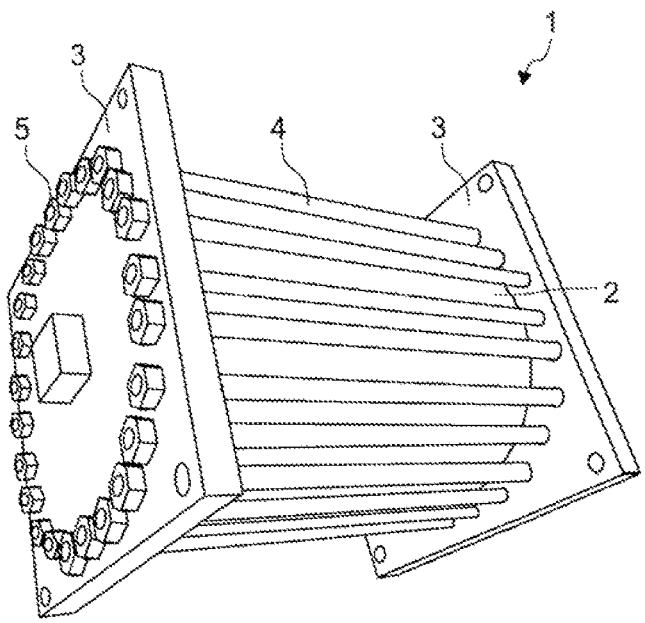
FIG. 2 is a perspective view showing the external appearance of a high-pressure hydrogen container according to Embodiment.
Figure 3:
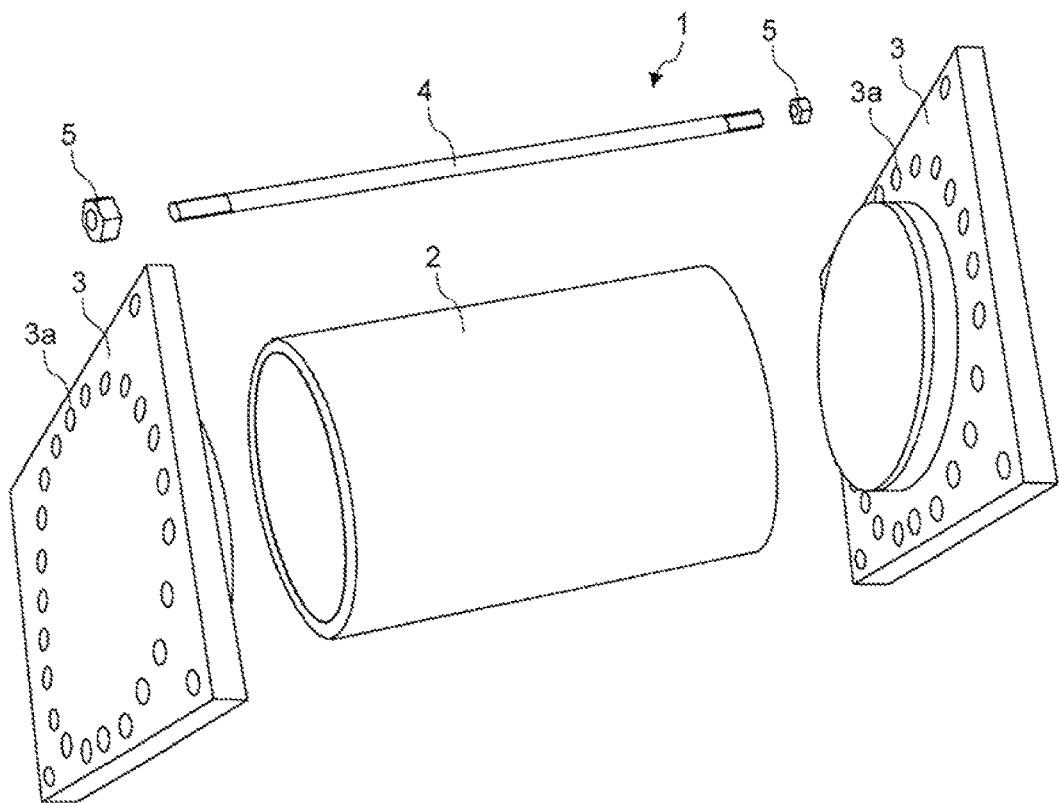
FIG. 3 is an exploded perspective view showing the high-pressure hydrogen container according to Embodiment.
Figure 4:
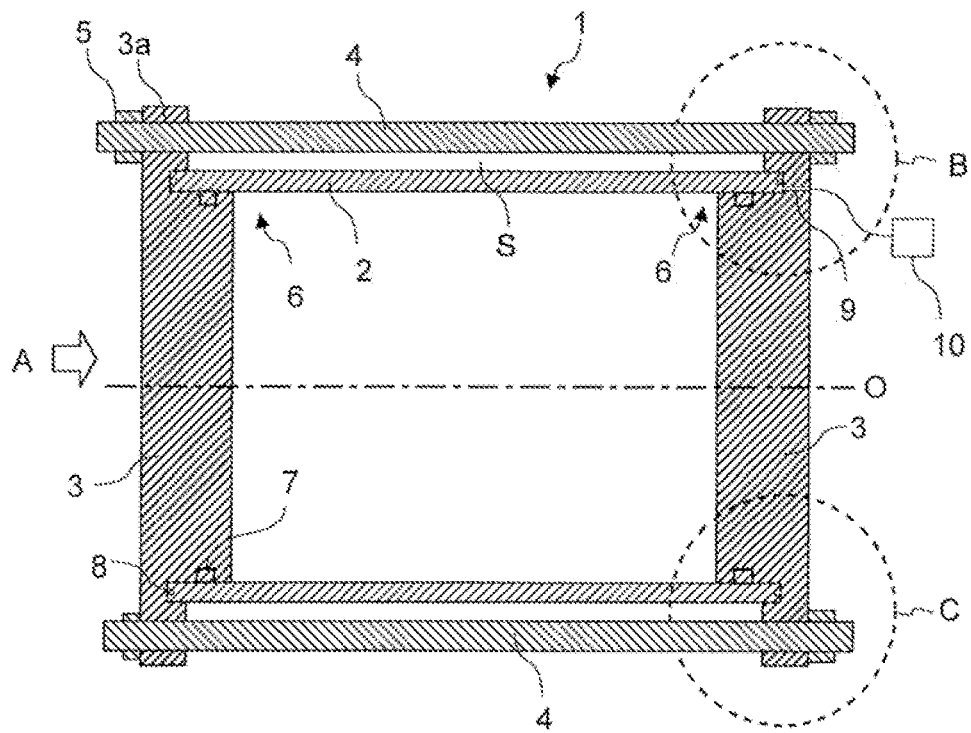
FIG. 4 is a schematic configuration diagram showing the high-pressure hydrogen container according to Embodiment.
Figure 5:
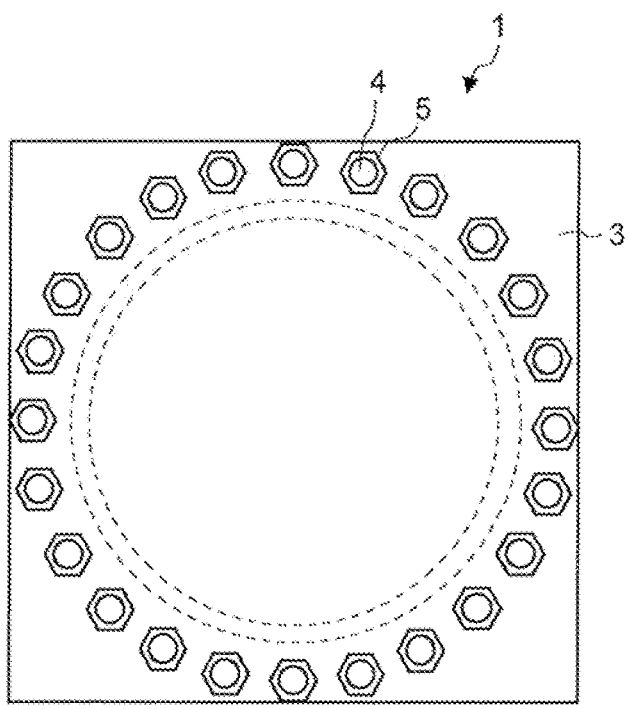
FIG. 5 is a side view showing the high-pressure hydrogen container according to Embodiment as viewed in a direction indicated by an arrow A in FIG. 4.

FIG. 2 is a perspective view showing the external appearance of the high-pressure hydrogen container 1 according to Embodiment. FIG. 3 is an exploded perspective view showing the high-pressure hydrogen container 1 according to Embodiment. FIG. 4 is a schematic configuration diagram showing the high-pressure hydrogen container 1 according to Embodiment. FIG. 5 is a side view showing the high-pressure hydrogen container 1 according to Embodiment as viewed in a direction indicated by an arrow A in FIG. 4.

The high-pressure hydrogen container 1 shown in FIG. 2, FIG. 3, FIG. 4, and FIG.

5 stores high-pressure hydrogen. The high-pressure hydrogen container 1 includes a metal cylinder 2, a pair of lid parts 3, and a plurality of fastening parts 4. The metal cylinder 2 is configured to store high-pressure hydrogen. The, pair of lid parts 3 cover both respective end portions of the metal cylinder 2. The plurality of fastening parts 4 fix the pair of lid parts 3 in a state where the metal cylinder 2 is clamped between one lid part 3 and the other lid part 3 of the pair of lid parts 3.

Metal Cylinder 2

The metal cylinder 2 is a cylindrical part configured to store high-pressure hydrogen, and both end portions of the cylindrical part are open. To prevent leakage of high-pressure hydrogen that is stored in the metal cylinder 2, the metal cylinder 2 is formed by a seamless cylindrical part made of metal.

The metal cylinder 2 is made of low alloy steel, for example. That is, the metal cylinder 2 is configured to contain any one of chromium-molybdenum steel, nickel-chromium-molybdenum steel, manganese chromium steel, manganese steel, or boron-added steel, for example.

A decarburized layer is removed from the inner peripheral surface of the metal cylinder 2. After the decarburized layer is removed, a residual compressive stress is applied to the inner peripheral surface of the metal cylinder 2 by projecting shot balls having a large mass.

A carbon fiber reinforced resin portion may be wound around the outer periphery of the metal cylinder 2. The carbon fiber reinforced resin portion is provided to ensure mechanical strength, which is desired pressure resistance of the metal cylinder 2. The carbon fiber reinforced resin portion is made of a composite material obtained in such a manner that carbon fiber is used as a reinforcing material and is impregnated with a resin to increase strength. PAN-based carbon fiber or PITCH-based carbon fiber, for example, is used.

Lid Part 3

The lid parts 3 are mounted on and cover both respective end portions of the metal cylinder 2, and thus close the metal cylinder 2. A plate-like body having a square-shaped front and back is used for each of the pair of lid parts 3. To allow the pair of lid parts 3 to be easily installed or stacked, the pair of lid parts 3 are mounted such that each pair of the upper sides, the lower sides, the left sides, and the right sides of the pair of lid parts 3 are parallel to each other. The shape of the lid part 3 is not limited to the above-mentioned configuration, and the design may be suitably changed. At least one of the lid parts 3 is provided with a valve not shown in the drawing that communicates with a hydrogen passing hole not shown in the drawing. The valve is utilized for sealing or releasing high-pressure hydrogen. The pair of lid parts 3 are also made of metal substantially the same as the metal used for forming the metal cylinder 2.

Each of the pair of lid parts 3 has a plurality of through holes 3a through which the plurality of fastening parts 4 are inserted. Each through hole 3a of the lid part 3 may have a recessed portion that accommodates a nut 5 for the fastening part 4. Embodiment shows the case where no recessed portion is provided and hence, the nut 5 for each fastening part 4 protrudes to the outside of the lid part 3.

Fastening Part 4

A bolt is used as each fastening part 4. The bolt used as the fastening part 4 is a long bolt where the nuts 5 are screwed and fixed to both respective end portions of the bolt. Therefore, each of the plurality of fastening parts 4 is inserted into the through hole 3a opened in the one lid part 3 and into the through hole 3a opened in the other lid part 3, and protrudes to the outside of both lid parts 3. The nuts 5 are screwed and fixed to both respective end portions of the fastening part 4 protruding to the outside of both lid parts 3. For the fastening part 4, a bolt may be used where one end portion has a head portion and only the other end portion is screwed and fixed by the nut 5.

The plurality of fastening parts 4 are inserted into the through holes 3a opened in the one lid part 3 and into the through holes 3a opened in the other lid part 3, and are arranged such that the extending direction, that is, the longitudinal direction, of each fastening part 4 is parallel to a center axis O of the metal cylinder 2. The plurality of fastening parts 4 are separately arranged around the outer periphery of the metal cylinder 2, and thus surround the outer periphery of the metal cylinder 2. To be more specific, the plurality of fastening parts 4 are separately arranged at a plurality of points on the single circumference at regular intervals to perform fixing.

The metal cylinder 2 and the plurality of fastening parts 4, which surround the outer periphery of the metal cylinder 2, form concentric circles about the center axis O of the metal cylinder 2. That is, the plurality of fastening parts 4 are arranged on a circle about the center axis O of the metal cylinder 2. A gap S is opened between the metal cylinder 2 and the plurality of fastening parts 4, which surround the outer periphery of the metal cylinder 2, and the gap S causes the metal cylinder 2 to be separated from the plurality of fastening parts 4. The arrangement of the plurality of fastening parts 4 is not limited to the above-mentioned configuration, and may be changed to be suited for a design.

Both end portions of each of the plurality of fastening parts 4 are screwed and fixed at outsides of both respective lid parts 3. The fastening part 4 may be screwed and fixed by inserting a tool, such as a spanner, between the recessed portion of the lid part 3 and the nut 5. Alternatively, the fastening part 4 may have, at its head portion, an insertion hole into which a tool, such as a hexagonal wrench, is fitted, and the fastening part 4 may be screwed and fixed by fitting the tool into the insertion hole.

Detail of Portion B of High-Pressure Hydrogen Container 1

Figure 6:
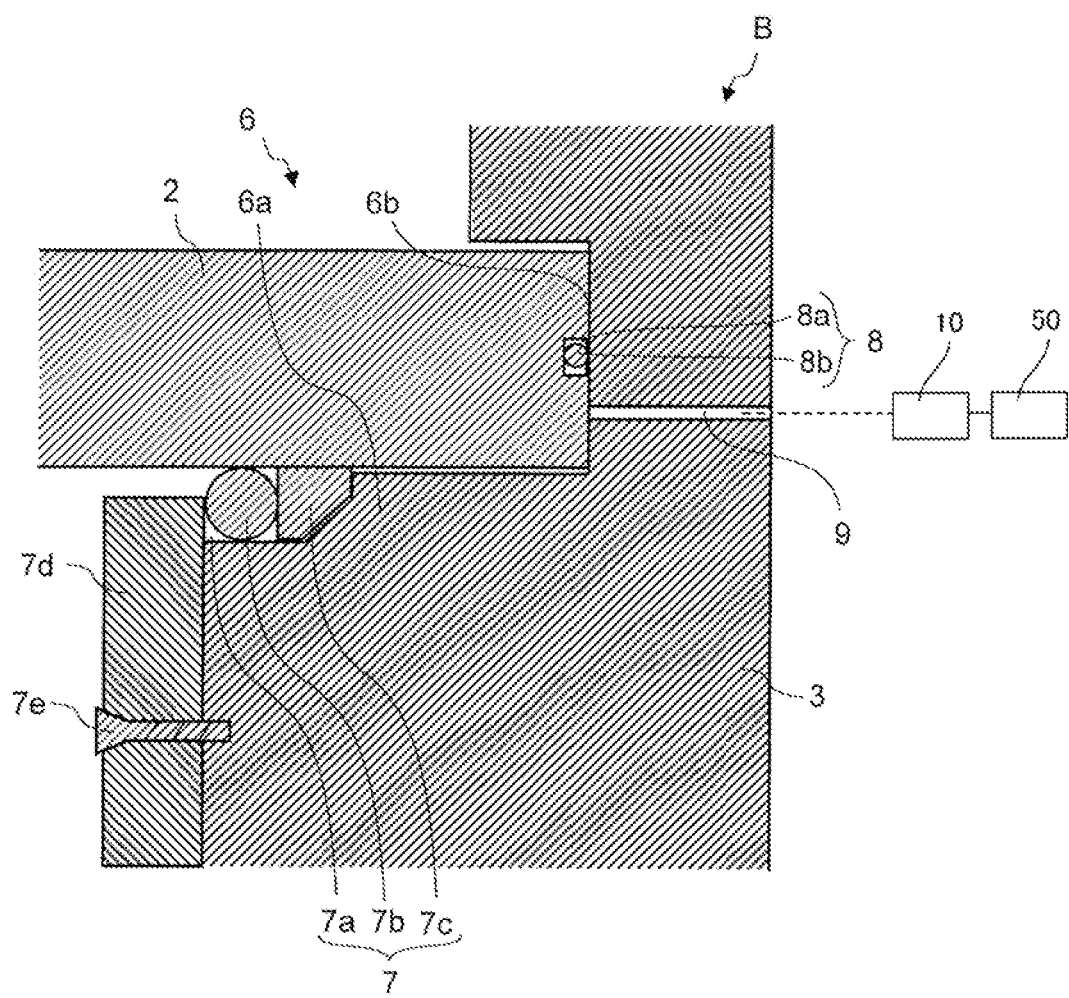
FIG. 6 is an enlarged view showing a portion B in FIG. 4, which is enlarged.

FIG. 6 is an enlarged view showing a portion B in FIG. 4, which is enlarged. As shown in FIG. 4 and FIG. 6, the high-pressure hydrogen container 1 has two fitting structures 6 in which the metal cylinder 2 and each of the pair of lid parts 3 are fitted to each other.

As shown in FIG. 6, each of the two fitting structures 6 includes a protruding portion 6a and a groove portion 6b. The protruding portion 6a has an outer periphery that is fitted in the inner periphery of the metal cylinder 2 at one side of each of the pair of lid parts 3 that faces the metal cylinder 2. On the outer periphery of the protruding portion 6a at one side of each of the pair of lid parts 3 that faces the metal cylinder 2, the groove portion 6b is recessed in a direction opposite to the protruding direction of the protruding portion 6a, and allows the end portion of the metal cylinder 2 to be fitted in the groove portion 6b. The fitting structure 6 may achieve fitting with another shape.

A first sealing portion 7 is provided. The first sealing portion 7 provides sealing between the peripheral side surface of the protruding portion 6a and the inner peripheral surface of the metal cylinder 2. The first sealing portion 7 includes a first seal groove 7a, a first O-ring 7b, and a backup ring 7c. The first seal groove 7a is formed in the peripheral side surface of the protruding portion 6a about the whole circumference, the first O-ring 7b is disposed in the first seal groove 7a, and the backup ring 7c is disposed in the first seal groove 7a at a position closer to the lid part 3 than is the first O-ring 7b. The first seal groove 7a is formed by fixing a retainer ring 7d to the protrusion portion of the lid part 3, which is provided with the protruding portion 6a, by screws 7e. The retainer ring 7d is formed to have an outer diameter larger than the diameter of the bottom surface of the first seal groove 7a. With such a configuration, between the protrusion portion of the lid part 3 and the retainer ring 7d, the first seal groove 7a is formed into an annular groove where the protruding portion 6a has a small outer peripheral dimension. A configuration is adopted where the retainer ring 7d prevents the first O-ring 7b and the backup ring 7c from falling from the first seal groove 7a formed into the annular groove. It is not always necessary for the first sealing portion 7 to include the backup ring 7c, and the first sealing portion 7 may include a second backup ring disposed in the first seal groove 7a at a position closer to the metal cylinder 2 than is the first O-ring 7b. The peripheral side surface of the protruding portion 6a and the inner peripheral surface of the metal cylinder 2 are parallel to each other along the center axis O of the metal cylinder 2. The retainer ring 7d may be made of a metal material different from a metal material used for forming the lid part 3.

A second sealing portion 8 is provided. The second sealing portion 8 provides sealing between the bottom portion of the groove portion 6b and the end surface of the metal cylinder 2 that is fitted into the groove portion 6b and is brought into contact with the bottom portion of the groove portion 6b. The second sealing portion 8 includes a second seal groove 8a and a second O-ring 8b. The second seal groove 8a is formed in the end surface of the metal cylinder 2 such that the second seal groove 8a extends along the end surface of the metal cylinder 2, which is circular-shaped, and the second O-ring 8b is disposed in the second seal groove 8a. Each of the end surface of the metal cylinder 2 and the bottom surface of the groove portion 6b is a flat surface orthogonal to the center axis O of the metal cylinder 2.

Provided that the first sealing portion 7 and the second sealing portion 8 are configured to seal surfaces, the configurations of the first sealing portion 7 and the second sealing portion 8 are not limited to the above-mentioned configurations, and a well-known technique may be used.

A leak port 9 is provided that allows a space between the first sealing portion 7 and the second sealing portion 8 and an outside to communicate with each other. A hydrogen sensor 10 is provided at the outlet of the leak port 9. The hydrogen sensor 10 monitors hydrogen leakage before a situation where the first sealing portion 7 ruptures and the second sealing portion 8 thus ruptures. There may be a case where hydrogen leakage is caused by deterioration of a material forming the seal even if a situation is not brought about where the first sealing portion 7 or the second sealing portion 8 does not rupture. In Embodiment, the leak port 9 is formed in at least one of the lid parts 3. It is only required that the leak port 9 be formed and opened in the metal cylinder 2 at a position closer to the lid part 3 than is the first sealing portion 7, that is, the leak port 9 be formed and opened, out of the surfaces of the lid part 3, at one surface that faces the metal cylinder 2 at a position between a portion with which the first sealing portion 7 is brought into contact and a portion with which the second sealing portion 8 is brought into contact. The leak port 9 is located at a position closer to the inner portion where hydrogen is stored than is the second sealing portion 8 and hence, hydrogen does not reach the groove portion 6b and the portion where the fastening part 4 is fastened, each to which stress is easily concentrated. The strength of a portion where stress is concentrated is thus not lowered by hydrogen and hence, reliability of the strength of the high-pressure hydrogen container 1 is increased.

As shown in FIG. 6, the leak port 9 communicates with the outside of the high-pressure hydrogen container 1. A configuration is adopted where gas that passes through the leak port 9 is introduced to the hydrogen sensor 10, which is installed outside the high-pressure hydrogen container 1. The hydrogen sensor 10 detects hydrogen in gas that is introduced through the leak port 9. The high-pressure hydrogen container 1 may be configured to give warning when the hydrogen sensor 10 detects that the content of hydrogen contained in gas is higher than or equal to a specified value.

The hydrogen sensor 10 may constantly monitor gas that is introduced through the leak port 9. Hydrogen passes through a material forming the first O-ring 7b in the first sealing portion 7 of the high-pressure hydrogen container 1 and hence, hydrogen of a predetermined amount constantly leaks from the leak port 9. The hydrogen sensor 10 constantly monitors gas that is introduced through the leak port 9 and hence, a change in the amount of hydrogen contained in gas can be detected. Hydrogen leakage caused by abnormality, such as deterioration and rupture of the first sealing portion 7, thus can be detected from such a change.

Due to constant monitoring by the hydrogen sensor 10, it is also possible to determine whether the hydrogen sensor 10 itself is operating normally. That is, when the hydrogen sensor 10 is operating normally, the hydrogen sensor 10 constantly detects hydrogen that passes through the first sealing portion 7. In the case where the hydrogen sensor 10 detects no hydrogen, it is thus possible to determine that the hydrogen sensor 10 itself is not operating normally. Therefore, by giving warning also when the hydrogen sensor 10 detects no hydrogen, abnormality of the hydrogen sensor 10 itself can also be detected and hence, reliability of the high-pressure hydrogen container 1 is increased.

The hydrogen sensor 10 may include a notification device 50 that notifies a change in the amount of hydrogen in gas that is introduced through the leak port 9. The notification device 50 may notify that the hydrogen sensor 10 detects no hydrogen, that is, the amount of hydrogen contained in gas is substantially zero. The notification device 50 may be achieved by means, such as a display and a warning lamp disposed outside the high-pressure hydrogen container 1.

Figure 7:
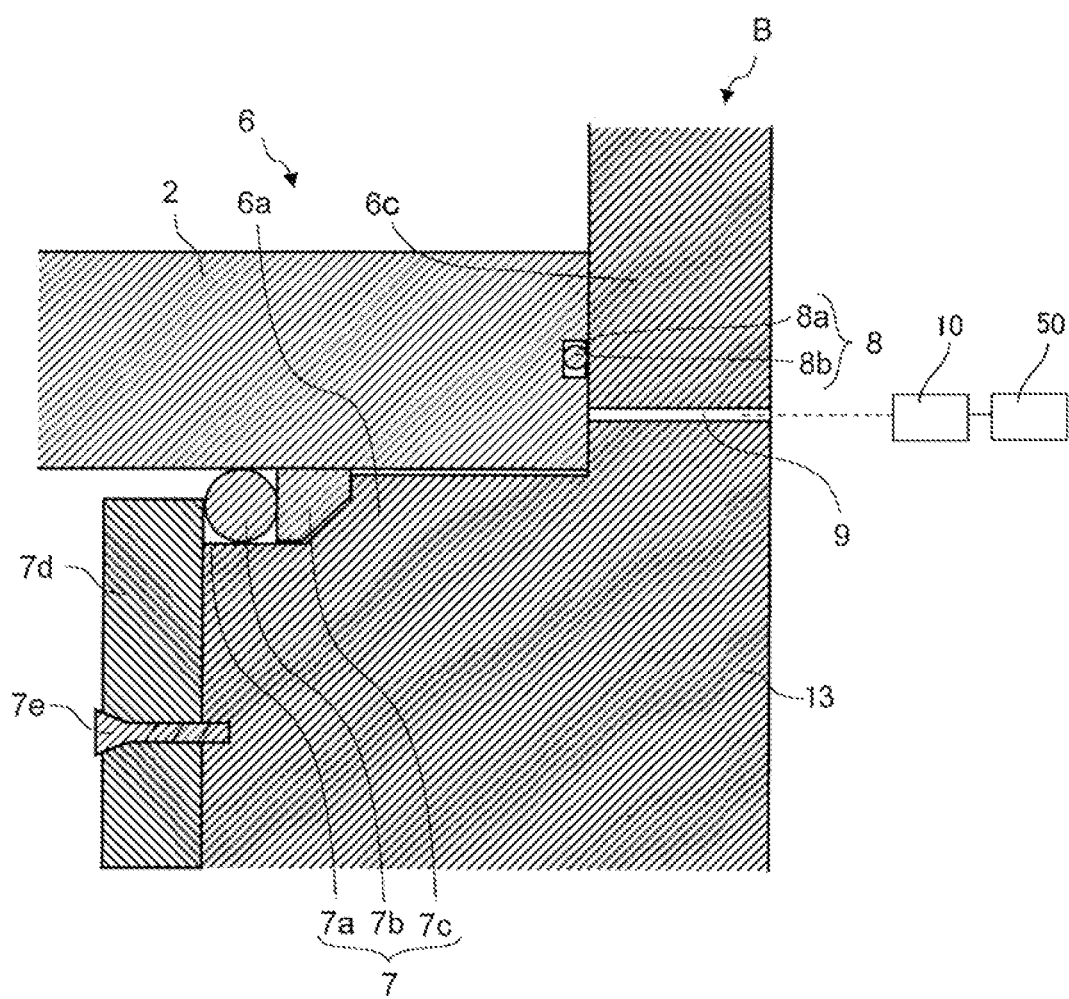
FIG. 7 is an enlarged view of a portion of a modification of the high-pressure hydrogen container 1 according to Embodiment.

FIG. 7 is an enlarged view of a portion of a modification of the high-pressure hydrogen container 1 according to Embodiment. In the modification of the high-pressure hydrogen container 1 shown in FIG. 7, the shape of the lid part 3 is changed, and the end portion of the metal cylinder 2 is not fitted into the groove portion 6b, but is made to be in contact with a flange portion 6c. When the strength of the flange portion 6c can be ensured, a lid part 13 according to the modification can ensure strength substantially equal to the strength of the lid part 3 and hence, leakage of hydrogen from the inside can also be reduced.

Detail of Portion C of High-Pressure Hydrogen Container 1

Figure 8:
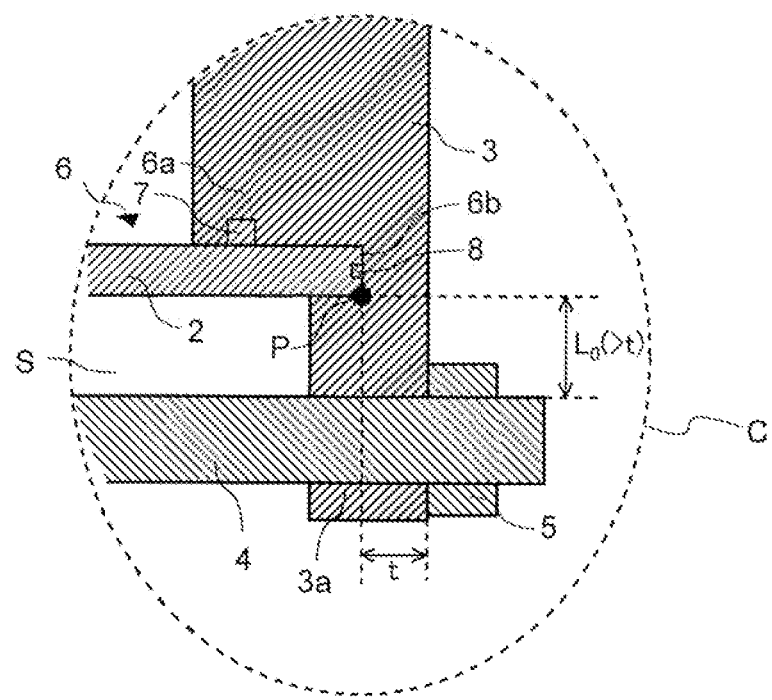
FIG. 8 is an enlarged view showing a portion C in FIG. 4, which is enlarged.

FIG. 8 is an enlarged view showing a portion C in FIG. 4, which is enlarged. As shown in FIG. 8, the high-pressure hydrogen container 1 has a common through position P, with a common shortest distance, that is common to a route to the outside through either one of the pair of lid parts 3 in a route from the inside to the outside of the metal cylinder 2 in the metal cylinder 2 and the pair of lid parts 3 and a route to a position where the fastening part 4 that is disposed closest to the metal cylinder 2 out of the plurality of fastening parts 4 is inserted through the lid part 3 in a route from the inside to the outside of the metal cylinder 2 in the metal cylinder 2 and the pair of lid parts 3. The minimum thickness of the lid part 3 from the common through position P to the outside is given as t [mm]. A distance between the common through position P and the position where the fastening part 4 that is disposed closest to the metal cylinder 2 out of the plurality of fastening parts 4 is inserted through the lid part 3 is given as L0 [mm]. In this case, L0>t is satisfied. The reason L0 is determined with reference to the position where the fastening part 4 that is disposed closest to the metal cylinder 2 out of the plurality of fastening parts 4 is inserted through either one of the pair of lid parts 3 is that the case is taken into account where the plurality of fastening parts 4 are not separately arranged on the single circle.

Advantageous Effects of Embodiment

In Embodiment, the high-pressure hydrogen container 1 includes the metal cylinder 2 configured to store high-pressure hydrogen. The high-pressure hydrogen container 1 includes the pair of lid parts 3 configured to cover both respective end portions of the metal cylinder 2. The high-pressure hydrogen container 1 includes the plurality of fastening parts 4 configured to fix the pair of lid parts 3 in a state where the metal cylinder 2 is clamped between the one lid part 3 and the other lid part 3 of the pair of lid parts 3.

With such a configuration, the plurality of fastening parts 4 fix the pair of lid parts 3 in a state where the metal cylinder 2 is clamped between the one lid part 3 and the other lid part 3 of the pair of lid parts 3. Therefore, the high-pressure hydrogen container 1 can be manufactured by fixing the pair of lid parts 3 with the plurality of fastening parts 4. Accordingly, it is possible to provide the high-pressure hydrogen container 1 having a simple configuration, requiring less labor for manufacture, achieving reduced manufacturing costs, and ensuring pressure resistance.

In Embodiment, a bolt is used for each of the fastening parts 4.

With such a configuration, the high-pressure hydrogen container 1 can be manufactured by fixing the pair of lid parts 3 with the plurality of fastening parts 4 each of which is a bolt.

In Embodiment, each of the pair of lid parts 3 has the plurality of through holes 3a through which the plurality of fastening parts 4 are inserted. The plurality of fastening parts 4 are inserted into the respective through holes 3a opened in the one lid part 3 and into the respective through holes 3a opened in the other lid part 3.

With such a configuration, the plurality of fastening parts 4 are inserted into the respective through holes 3a opened in the one lid part 3 and into the respective through holes 3a opened in the other lid part 3, and the high-pressure hydrogen container 1 can be manufactured by fixing the pair of lid parts 3 with the plurality of fastening parts 4.

In Embodiment, the plurality of fastening parts 4 are inserted into the through holes 3a opened in the one lid part 3 and into the through holes 3a opened in the other lid part 3, and are arranged such that the extending direction, that is, the longitudinal direction, of each of the plurality of fastening parts 4 is parallel to the center axis O of the metal cylinder 2.

With such a configuration, the clamping force of each of the plurality of fastening parts 4 for clamping and fixing the metal cylinder 2 is generated in a direction parallel to the center axis O of the metal cylinder 2, and the clamping force is not skewed and hence, durability of the high-pressure hydrogen container 1 can be increased.

In Embodiment, the plurality of fastening parts 4 are separately arranged around the outer periphery of the metal cylinder 2, and thus surround the outer periphery of the metal cylinder 2.

With such a configuration, the plurality of fastening parts 4 are separately arranged around the outer periphery of the metal cylinder 2, and thus surround the outer periphery of the metal cylinder 2, and can exhibit a clamping force of clamping and fixing the metal cylinder 2 in a state where the fastening parts 4 are separated from each other around the outer periphery of the metal cylinder 2. Accordingly, the clamping force is exhibited in a well-balanced manner around the outer periphery of the metal cylinder 2 and hence, durability of the high-pressure hydrogen container 1 can be increased.

In Embodiment, the plurality of fastening parts 4 are separately arranged on the single circumference at the regular intervals. The metal cylinder 2 and the plurality of fastening parts 4, which surround the outer periphery of the metal cylinder 2, form concentric circles about the center axis O of the metal cylinder 2.

With such a configuration, the plurality of fastening parts 4, which form the concentric circle about the center axis O of the metal cylinder 2, are separated from each other around the outer periphery of the metal cylinder 2 with a constant distance from the metal cylinder 2, and can exhibit a clamping force of clamping and fixing the metal cylinder 2. Accordingly, the plurality of fastening parts 4 can exhibit the clamping force in a well-balanced manner around the outer periphery of the metal cylinder 2 in a state where the plurality of fastening parts 4 equally affect the metal cylinder 2 and hence, durability of the high-pressure hydrogen container 1 can be increased.

In Embodiment, the gap S is opened between the metal cylinder 2 and the plurality of fastening parts 4, which surround the outer periphery of the metal cylinder 2, and the gap S thus causes the metal cylinder 2 to be separated from the plurality of fastening parts 4.

With such a configuration, hydrogen penetrates into the metal cylinder 2, which is in direct contact with stored high-pressure hydrogen. However, the plurality of fastening parts 4 are provided with the gap S and hence, hydrogen seeping from the metal cylinder 2 diffuses from the gap S and does not penetrate into the plurality of fastening parts 4. Accordingly, the high-pressure hydrogen container 1 does not cause hydrogen-caused deterioration of the plurality of fastening parts 4 and hence, durability of the plurality of fastening parts 4 can be increased. Further, because of the presence of the gap S between the metal cylinder 2 and the plurality of fastening parts 4, even when the metal cylinder 2 is deformed in the circumferential direction by high-pressure hydrogen stored in the metal cylinder 2, the stress that causes the deformation is not transferred to the plurality of fastening parts 4. In addition to the above, the fastening parts 4 are provided with the gap S, portions of the lid part 3 that receive load from the fastening parts 4 are thus also separated from a portion where the metal cylinder 2 is fitted into the lid part 3. Accordingly, the portions where stress is generated are not easily affected by hydrogen embrittlement and hence, reliability of strength is increased.

In Embodiment, the high-pressure hydrogen container 1 has two fitting structures 6 in which the metal cylinder 2 and each of the pair of lid parts 3 are fitted to each other.

With such a configuration, the metal cylinder 2 and each of the pair of lid parts 3 are fitted to each other by the corresponding one of the two fitting structures 6 and hence, it is possible to ensure sealing performance between the metal cylinder 2 and each of the pair of lid parts 3. Accordingly, the high-pressure hydrogen container 1 can form a container that prevents stored high-pressure hydrogen from easily leaking.

In Embodiment, each of the two fitting structures 6 includes the protruding portion 6a having an outer periphery that is fitted in the inner periphery of the metal cylinder 2 at one side of each of the pair of lid parts 3 that faces the metal cylinder 2.

Each of the pair of lid parts 3 also includes the groove portion 6b that is recessed in a direction opposite to the protruding direction of the protruding portion 6a and allows the end portion of the metal cylinder 2 to be fitted in the groove portion 6b at the outer periphery of the protruding portion 6a, which faces the metal cylinder 2.

With such a configuration, the metal cylinder 2 and each of the pair of lid parts 3 are fitted to each other by the corresponding one of the two fitting structures 6, each of which includes the protruding portion 6a and the groove portion 6b, and hence, it is possible to ensure sealing performance between the metal cylinder 2 and each of the pair of lid parts 3.

In Embodiment, the first sealing portion 7 is provided, and the first sealing portion 7 provides sealing between the peripheral side surface of the protruding portion 6a and the inner peripheral surface of the metal cylinder 2.

With such a configuration, the first sealing portion 7 provides sealing between the peripheral side surface of the protruding portion 6a and the inner peripheral surface of the metal cylinder 2 and hence, it is possible to ensure sealing performance between the metal cylinder 2 and each of the pair of lid parts 3.

In Embodiment, the first sealing portion 7 includes the first seal groove 7a formed in the peripheral side surface of the protruding portion 6a about the whole circumference, the first O-ring 7b disposed in the first seal groove 7a, and the backup ring 7c disposed in the first seal groove 7a at a position closer to the lid part 3 than is the first O-ring 7b.

With such a configuration, the first sealing portion 7 uses the first O-ring 7b and the backup ring 7c, which are disposed in the first seal groove 7a, and the first sealing portion 7 provides sealing between the peripheral side surface of the protruding portion 6a and the inner peripheral surface of the metal cylinder 2 and hence, it is possible to ensure sealing performance between the metal cylinder 2 and each of the pair of lid parts 3.

In Embodiment, the second sealing portion 8 is provided, and the second sealing portion 8 provides sealing between the bottom portion of the groove portion 6b and the end surface of the metal cylinder 2 that is fitted into the groove portion 6b and is brought into contact with the bottom portion of the groove portion 6b.

With such a configuration, the second sealing portion 8 provides sealing between the bottom portion of the groove portion 6b and the end surface of the metal cylinder 2 and hence, it is possible to ensure sealing performance between the metal cylinder 2 and each of the pair of lid parts 3. Further, the second sealing portion 8 serves as a top seal having a different sealing surface from the sealing surface of the first sealing portion 7, which serves as a bore seal. Accordingly, the configuration where the second sealing portion 8 has a different sealing surface from the sealing surface of the first sealing portion 7, and there is thus no possibility that the second sealing portion 8 is affected by sealing performance of the first sealing portion 7 and hence, in addition to the first sealing portion 7, the second sealing portion 8 can also ensure sealing performance of the high-pressure hydrogen container 1, and thus can improve hydrogen leakage preventing performance of the high-pressure hydrogen container 1. Further, the first sealing portion 7 and the second sealing portion 8 may be collectively provided to the same fitting structure 6 having different surfaces that include a surface to which the first sealing portion 7 is provided and the second sealing portion 8 is provided. Accordingly, the first sealing portion 7 and the second sealing portion 8 can be efficiently disposed.

In Embodiment, the second sealing portion 8 includes the second seal groove 8a formed in the end surface of the metal cylinder 2 such that the second seal groove 8a extends along the end surface of the metal cylinder 2, which is circular-shaped, and the second O-ring 8b disposed in the second seal groove 8a.

With such a configuration, the second sealing portion 8 uses the second O-ring 8b disposed in the second seal groove 8a, and provides sealing between the bottom portion of the groove portion 6b and the end surface of the metal cylinder 2 and hence, it is possible to ensure sealing performance between the metal cylinder 2 and each of the pair of lid parts 3. Further, the second O-ring 8b is not disposed at the bottom portion of the groove portion 6b of the lid part 3, but is disposed in the second seal groove 8a formed in the end surface of the metal cylinder 2. Accordingly, the second seal groove 8a can be easily formed and the second O-ring 8b can be easily disposed and hence, the second sealing portion 8 can be easily formed.

In Embodiment, at least one of the lid parts 3 is provided with the leak port 9 that allows a space between the first sealing portion 7 and the second sealing portion 8 and an outside to communicate with each other.

With such a configuration, stored hydrogen flows out from the leak port 9 and hence, it is possible to detect rupture or deterioration of the first sealing portion 7 before rupture or deterioration of the second sealing portion 8. Accordingly, it is possible to detect rupture or deterioration of the first sealing portion 7 before hydrogen leaks from the high-pressure hydrogen container 1 because of rupture or deterioration of the second sealing portion 8 and hence, it is possible to prevent leakage of hydrogen from the high-pressure hydrogen container 1.

In Embodiment, the high-pressure hydrogen container 1 further includes the hydrogen sensor 10 configured to detect hydrogen contained in gas that passes through the leak port 9. The hydrogen sensor 10 constantly monitors the amount of hydrogen contained in the gas that passes through the leak port 9, and the hydrogen sensor 10 gives a notification when the amount of hydrogen contained in the gas is higher than or equal to a specified value. The hydrogen sensor 10 also gives a notification when the amount of hydrogen contained in the gas becomes zero. With such a configuration, the high-pressure hydrogen container 1 can surely detect hydrogen leakage caused by rupture or deterioration of the first sealing portion 7, and can also determine whether the hydrogen sensor 10 is operating normally. Accordingly, it is possible to increase the certainty of detection of hydrogen leakage and hence, reliability of the high-pressure hydrogen container 1 is increased.

In Embodiment, the high-pressure hydrogen container 1 has the common through position P, with a common shortest distance, which is common to a route to the outside through either one of the pair of lid parts 3 in a route from the inside to the outside of the metal cylinder 2 in the metal cylinder 2 and the pair of lid parts 3 and a route to a position where the fastening part 4 that is disposed closest to the metal cylinder 2 out of the plurality of fastening parts 4 is inserted through the lid part 3 in a route from the inside to the outside of the metal cylinder 2 in the metal cylinder 2 and the pair of lid parts 3. The minimum thickness of the lid part 3 from the common through position P to the outside is given as t [mm]. A distance between the common through position P and the position where the fastening part 4 that is disposed closest to the metal cylinder 2 out of the plurality of fastening parts 4 is inserted through the lid part 3 is given as L0 [mm]. In such a case, L0>t is satisfied.

With such a configuration, hydrogen penetrates into the metal cylinder 2 and the pair of lid parts 3, which are in direct contact with stored high-pressure hydrogen. However, in the case where L0>t is satisfied, hydrogen does not penetrate into the plurality of fastening parts 4 through the lid part 3 prior to the penetration of hydrogen through the lid part 3 from the inside to the outside. Accordingly, the high-pressure hydrogen container 1 does not cause hydrogen-caused deterioration of the plurality of fastening parts 4 prior to hydrogen-caused deterioration of the lid part 3 and hence, the high-pressure hydrogen container 1 is not easily damaged.

In Embodiment, a plate-like body having a square-shaped front and back is used for each of the pair of lid parts 3.

With such a configuration, a manufacturer can perform processing on each of the pair of lid parts 3 not by milling but by lathe machining. Accordingly, the processing costs can be reduced, and the high-pressure hydrogen container 1 can be easily manufactured.

In Embodiment, the high-pressure hydrogen container 1 serves as a portion of the counterweight of a transport vehicle.

With such a configuration, the weight of the high-pressure hydrogen container 1 is increased by the metal cylinder 2, the pair of lid parts 3, and the plurality of fastening parts 4. Accordingly, it is possible to reduce the total amount of the counterweight mounted on a transport vehicle and hence, the number of parts of the transport vehicle can be reduced. Therefore, it is possible to reduce a manufacturing cost of the transport vehicle.

REFERENCE SIGNS LIST

1: high-pressure hydrogen container, 2: metal cylinder, 3: lid part, 3a: through hole, 4: fastening part, 5: nut, 6: fitting structure, 6a: protruding portion, 6b: groove portion, 6c: flange portion, 7: first sealing portion, 7a: first seal groove, 7b: first O-ring, 7c: backup ring, 7d: retainer ring, 7e: screw, 8: second sealing portion, 8a: second seal groove, 8b: second O-ring, 9: leak port, 10: hydrogen sensor, 13: lid part, 50: notification device, 100: forklift, 101: vehicle body, 102: cargo handling device, 103: driver's seat, 104: fuel cell, 105: power generation unit, 106: front wheel, 107: rear wheel, 108: counterweight

The invention claimed is:

1. A high-pressure hydrogen container comprising:
a metal cylinder configured to store high-pressure hydrogen;
a pair of lid parts configured to cover both end portions of the metal cylinder; and
a plurality of fastening parts configured to fix the pair of lid parts in a state where the metal cylinder is clamped between the pair of lid parts,
a bolt being used for each of the plurality of fastening parts,
each of the pair of lid parts having a plurality of through holes through which the plurality of fastening parts are inserted,
the plurality of fastening parts being each inserted into corresponding ones of the plurality of through holes that are opened in each of the pair of lid parts, the plurality of fastening parts being arranged such that a longitudinal direction of each of the plurality of fastening parts is parallel to a center axis of the metal cylinder,
the plurality of fastening parts being separately arranged around an outer periphery of the metal cylinder and surrounding the outer periphery of the metal cylinder, the plurality of fastening parts being separately arranged on a single circumference at regular intervals,
the metal cylinder and the plurality of fastening parts, which surround the outer periphery of the metal cylinder, forming concentric circles about a center axis of the metal cylinder.

2. The high-pressure hydrogen container of claim 1, wherein a gap is opened between the metal cylinder and the plurality of fastening parts, which surround the outer periphery of the metal cylinder, and the gap causes the metal cylinder to be separated from the plurality of fastening parts, the high-pressure hydrogen container comprising two fitting structures in which the metal cylinder and each of the pair of lid parts are fitted to each other, each of the pair of lid parts including a protruding portion having an outer periphery that is fitted in an inner periphery of the metal cylinder at one side of each of the pair of lid parts that faces the metal cylinder.

3. The high-pressure hydrogen container of claim 2 comprising a first sealing portion configured to provide sealing between a peripheral side surface of the protruding portion and an inner peripheral surface of the metal cylinder; and a second sealing portion configured to provide sealing between each of the pair of lid parts and an end surface of the metal cylinder that is brought into contact with the lid part, the first sealing portion including a first seal groove formed in the peripheral side surface of the protruding portion about a whole circumference, a first O-ring disposed in the first seal groove, and a backup ring disposed in the first seal groove at a position closer to a lid part of the pair of lid parts than is the first O-ring, the second sealing portion including a second seal groove formed in the end surface of the metal cylinder such that the second seal groove extends along the end surface of the metal cylinder, which is circular-shaped, and a second O-ring disposed in the second seal groove.

4. The high-pressure hydrogen container of claim 3, wherein at least one of the lid parts is provided with a leak port that allows a space between the first sealing portion and the second sealing portion and an outside to communicate with each other.

5. The high-pressure hydrogen container of claim 4, further comprising a hydrogen sensor configured to detect hydrogen contained in gas that passes through the leak port, the hydrogen sensor being configured to constantly monitor an amount of hydrogen contained in the gas that passes through the leak port, and being configured to give a notification when the amount of hydrogen contained in the gas that passes through the leak port is higher than or equal to a specified value or when an amount of hydrogen contained in the gas that passes through the leak port becomes zero.

6. The high-pressure hydrogen container of claim 2, wherein each of the pair of lid parts further includes a groove portion that is located at a position close to the outer periphery of the protruding portion, and the groove portion is recessed in a direction opposite to a protruding direction of the protruding portion, and the metal cylinder is fitted in the groove portion.

7. The high-pressure hydrogen container of claim 1, wherein the high-pressure hydrogen container has a common through position, with a common shortest distance, that is common to a route to an outside through either one of the pair of lid parts in a route from an inside to an outside of the metal cylinder in the metal cylinder and the pair of lid parts and a route to a position where a fastening part that is disposed closest to the metal cylinder out of the plurality of fastening parts is inserted through the either one of the pair of lid parts in a route from the inside to the outside of the metal cylinder in the metal cylinder and the pair of lid parts, when a minimum thickness of the either one of the pair of lid parts from the common through position to the outside is given as t, and when a distance between the common through position and the position where the fastening part that is disposed closest to the metal cylinder out of the plurality of fastening parts is inserted through the either one of the pair of lid parts is given as LO, LO >t is satisfied.

8. The high-pressure hydrogen container of claim 1, wherein the high-pressure hydrogen container serves as a portion of a counterweight of a transport vehicle.

9. The high-pressure hydrogen container of claim 3, wherein each of the pair of lid parts further includes a groove portion that is located at a position close to the outer periphery of the protruding portion, and the groove portion is recessed in a direction opposite to a protruding direction of the protruding portion, and the metal cylinder is fitted in the groove portion.

10. The high-pressure hydrogen container of claim 4, wherein each of the pair of lid parts further includes a groove portion that is located at a position close to the outer periphery of the protruding portion, and the groove portion is recessed in a direction opposite to a protruding direction of the protruding portion, and the metal cylinder is fitted in the groove portion.

11. The high-pressure hydrogen container of claim 5, wherein each of the pair of lid parts further includes a groove portion that is located at a position close to the outer periphery of the protruding portion, and the groove portion is recessed in a direction opposite to a protruding direction of the protruding portion, and the metal cylinder is fitted in the groove portion.

12. The high-pressure hydrogen container of claim 2, wherein the high-pressure hydrogen container serves as a portion of a counterweight of a transport vehicle.

13. The high-pressure hydrogen container of claim 3, wherein the high-pressure hydrogen container serves as a portion of a counterweight of a transport vehicle.

14. The high-pressure hydrogen container of claim 4, wherein the high-pressure hydrogen container serves as a portion of a counterweight of a transport vehicle.

15. The high-pressure hydrogen container of claim 5, wherein the high-pressure hydrogen container serves as a portion of a counterweight of a transport vehicle.

16. The high-pressure hydrogen container of claim 6, wherein the high-pressure hydrogen container serves as a portion of a counterweight of a transport vehicle.

17. The high-pressure hydrogen container of claim 9, wherein the high-pressure hydrogen container serves as a portion of a counterweight of a transport vehicle.

18. The high-pressure hydrogen container of claim 10, wherein the high-pressure hydrogen container serves as a portion of a counterweight of a transport vehicle.

19. The high-pressure hydrogen container of claim 11, wherein the high-pressure hydrogen container serves as a portion of a counterweight of a transport vehicle.

* * * * *